May 23, 1933. A. W. KUBICA 1,910,772
STALK CUTTER ATTACHMENT FOR DISK PLOWS
Filed Oct. 5, 1932 2 Sheets-Sheet 1

Inventor

A. W. Kubica

By Clarence A O'Brien
Attorney

May 23, 1933. A. W. KUBICA 1,910,772
STALK CUTTER ATTACHMENT FOR DISK PLOWS
Filed Oct. 5, 1932 2 Sheets-Sheet 2
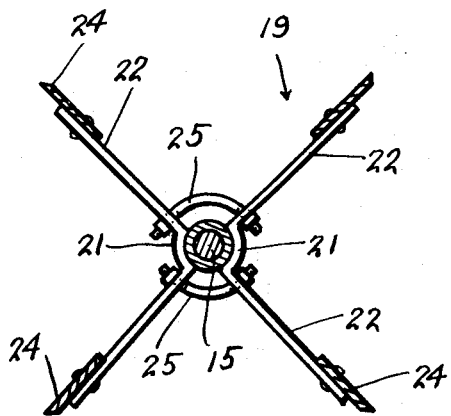
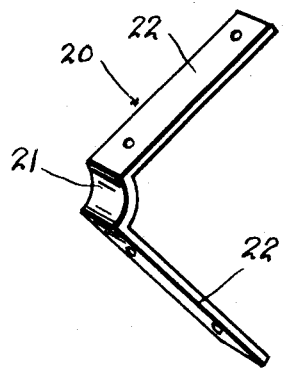
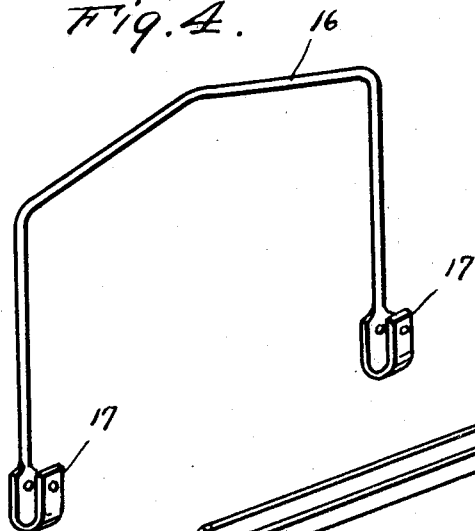
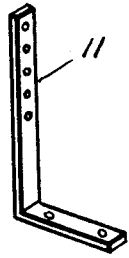
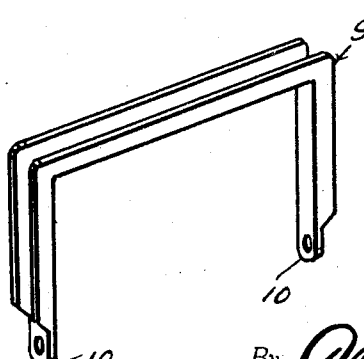
Inventor
A. W. Kubica Patented May 23, 1933

1,910,772

UNITED STATES PATENT OFFICE

ALOIS WILLIAM KUBICA, OF ROSENBERG, TEXAS

STALK CUTTER ATTACHMENT FOR DISK PLOWS

Application filed October 5, 1932. Serial No. 636,405.

This invention relates to a novel attachment for a two-row disk plow, and it has more specific reference to a rotary bladed stalk cutter such as is adapted for cutting or chopping corn and cotton stalks.

The attachment is designed to be detachably mounted on the tongue of the disk plow slightly in advance of the plow disk so that it may operate in conjunction with said disk.

In carrying the inventive idea into actual practice, I have discovered a simple and economical selection and arrangement of parts which, I believe, provides an unusually practicable and dependable structure such as will fulfill the requirements of an invention of this class in a noteworthy and efficient manner.

In the accompanying drawings wherein like numerals are employed to designate like parts throughout the same:

Figure 3 is a sectional view taken on the plane of the line 3—3 of Figure 1.

Figure 1:
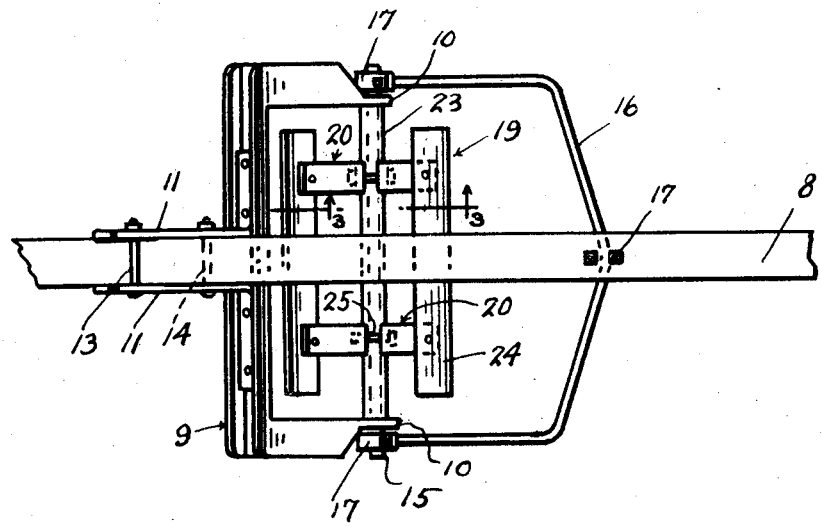
Figure 1 is a top plan view of an attachment constructed in accordance with the principles of this invention showing the manner in which it is applied to the tongue or shaft of the disk plow (not shown).
Figure 2:
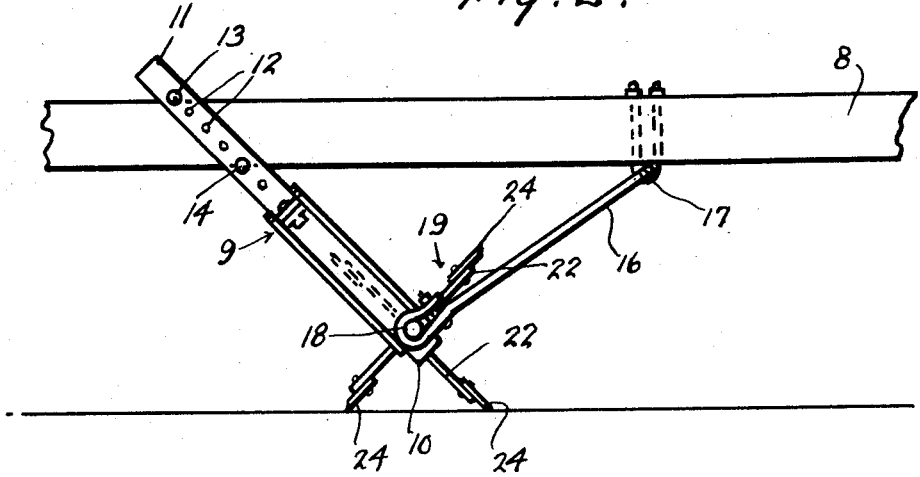
Figure 2 is a side elevational view of the structure seen in Figure 1.

Figures 4, 5, 6, and 7 are detail perspective views.

In the drawings, the numeral 8 designates the tongue on which the attachment is mounted. An essential feature of the attachment is the approximately U-shaped suspension yoke 9. This is made up of channel-shaped portions and the arms thereof are flattened and apertured as indicated at 10 to provide bearings. The bight or connecting portion of the yoke is adjustably attached to the tongue through the medium of L-shaped attaching brackets 11. These are provided with a multiplicity of bolt-holes 12 to accommodate the retaining bolts 13 and 14. The bolts are disposed transversely against the upper and lower sides of the tongue to support the parts 9 and 11 in the angular position illustrated in the drawings.

The numeral 15 designates a horizontal shaft which may be designated as the solid shaft, this being mounted in the bearings 10. In connection with this shaft I call attention to the bail 16 which constitutes a reinforcing and stabilizing member, the same being attached by a U-bolt 17 to the tongue. The free ends of the arms of the bail are fashioned as at 18 to provide keeper hooks which embrace the ends of the axle or shaft 15.

The rotary bladed cutter or chopper is generally distinguished by the numeral 19. This is made up of a plurality of opposed duplicate strap members 20 of the form illustrated in Figure 5. Each member is formed from a strap of metal whose central portion is bent as indicated at 21 and whose end portions are bent into obtuse angular relationship to dispose them in divergent form, said end portions being denoted by the numerals 22. Arcuate or curved bolts 25 serve to connect the respective companion members 20 together and clamp them around the hollow shaft 23 which is rotatably mounted on the solid shaft 15. The cutting blades, which are suitably secured to the portions 22 are denoted by the numerals 24.

It is to be observed that the yoke 9 is sturdy and well balanced and centrally connected in an inclined state to the tongue 8 through the medium of the brackets 11. The brackets 11 are formed with a multiplicity of apertures to selectively accommodate the retaining bolts 13 and 14 whereby to permit said brackets to be adjustably connected to the tongue to raise and lower the bladed rotor or cutter 19 to requisite elevation. The bladed cutter is freely rotatable on the axle 15 which is supported in the bearings 10 and braced evenly and uniformly through the medium of the hingedly mounted bail 16. All of these parts have been carefully selected, proportioned and mechanically coordinated to provide a novel ensemble which, it is believed, will satisfactorily accomplish the desired result.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

I claim:

1. An attachment of the class described comprising a yoke whose arm portions are formed with apertured terminals forming bearings, a pair of opposed L-shaped attaching brackets rigidly secured at one end to the intermediate portion of the yoke and having their opposite end portions provided with a plurality of bolt holes for selective reception of retaining bolts, a solid shaft mounted in said bearings, a bladed cutter including a tubular shaft mounted for rotation on said solid shaft.

2. An attachment of the class described comprising a yoke whose arm portions are formed with apertured terminals forming bearings, a pair of opposed L-shaped attaching brackets rigidly secured at one end to the intermediate portion of the yoke and having their opposite end portions provided with a plurality of bolt holes for selective reception of retaining bolts, a solid shaft mounted in said bearings, a bladed cutter including a tubular shaft mounted for rotation on said solid shaft, a bracing bail adapted for pivotal connection to the tongue, the free end portions of the arms of said bail being formed into hooks releasably embracing the end portions of said solid shaft.

3. In a cutter, a shaft, a plurality of blade supports on relatively opposite sides of the shaft and spaced in the direction of its length; each support including a pair of arms converging at one end, and an arcuate jaw connecting the arms at said one end; arcuate bolts connecting opposed supports and engaging the arms thereof in a manner to secure the jaws engaged with the shaft; and blades secured to the arms.

4. In a cutter, a pair of opposed blade supports each including an arcuate jaw having divergent arms extending reversely therefrom, and arcuate bolts connecting corresponding arms of the supports in a manner to hold the jaws in operative position relative to each other.

5. In a cutter of the class described, a pair of separate blade supports each including an arcuate jaw having divergent arms extending reversely therefrom, and bolts connecting corresponding arms of the supports in a manner to draw the jaws into clamping relation relative to each other, and a blade secured to each arm.

In testimony whereof I affix my signature.

ALOIS WILLIAM KUBICA.